US012741545B2

(12) United States Patent
Nissen et al.

(10) Patent No.: US 12,741,545 B2
(45) Date of Patent: Sep. 22, 2026

(54) BLENDED VEHICLE BRAKE SYSTEMS AND CONTROL LOGIC WITH FRICTION BRAKE BURNISH LEARNING AND COMPENSATION

(71) Applicant: GM GLOBAL TECHNOLOGY OPERATIONS LLC, Detroit, MI (US)

(72) Inventors: Colton Nissen, Westland, MI (US); Trevor Varney, Wolverine Lake, MI (US); William Wise, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 87 days.

(21) Appl. No.: 18/895,629

(22) Filed: Sep. 25, 2024

(65) Prior Publication Data

US 2026/0084541 A1 Mar. 26, 2026

(51) Int. Cl.
*B60L 7/26* (2006.01)

(52) U.S. Cl.
CPC ............. *B60L 7/26* (2013.01); *B60L 2240/10* (2013.01); *B60L 2240/16* (2013.01); *B60L 2240/642* (2013.01); *B60L 2240/647* (2013.01)

(58) Field of Classification Search
None
See application file for complete search history.

(56) References Cited

U.S. PATENT DOCUMENTS 5,415,466 A * 5/1995 Breen ..................... B60T 13/66
303/9.62
6,904,351 B1 * 6/2005 Hac ......................... B60T 8/172
180/197

(Continued)

FOREIGN PATENT DOCUMENTS

DE 102009004528 A1 10/2009
KR 20160123111 A * 10/2016 ............. B60T 17/18

(Continued)

OTHER PUBLICATIONS

Translation of KR-20160123111-A (Year: 2016).*

(Continued)

*Primary Examiner* — Faris S Almatrah
*Assistant Examiner* — Selena M Jin
(74) *Attorney, Agent, or Firm* — Quinn IP Law

(57) ABSTRACT

A blended brake system includes a regenerative (regen) brake system and a friction brake system that cooperatively decelerate a motor vehicle. A method of operating the blended brake system includes a vehicle controller receiving a brake command with a corresponding brake torque request. From this brake torque request, the controller determines a regen brake torque for the regen brake system and a friction brake torque for the friction brake system. The controller uses the friction brake torque and an estimated temperature of a rotating friction brake element to determine a temperature-dependent friction coefficient, and uses the friction brake torque and an estimated burnish state of the friction brake system to determine a burnish-dependent friction coefficient. A modified friction brake torque is calculated from a modified brake pressure coefficient derived from the temperature-dependent and burnish-dependent friction coefficients. The friction brake system applies the modified friction brake torque to slow/stop the vehicle.

20 Claims, 2 Drawing Sheets

(56) References Cited

U.S. PATENT DOCUMENTS

| | | | | |
|---|---|---|---|---|
| 6,915,201 | B1 * | 7/2005 | Ott | B60T 7/12 701/1 |
| 7,589,643 | B2 | 9/2009 | Dagci et al. | |
| 8,135,526 | B2 | 3/2012 | Minarcin et al. | |
| 8,494,732 | B2 | 7/2013 | Heap | |
| 8,996,273 | B2 | 3/2015 | Lee et al. | |
| 9,931,963 | B2 | 4/2018 | Heisel et al. | |
| 10,227,021 | B2 | 3/2019 | Lor et al. | |
| 10,259,341 | B2 | 4/2019 | Lor et al. | |
| 11,685,262 | B2 | 6/2023 | Otanez et al. | |
| 11,752,881 | B2 | 9/2023 | Otanez et al. | |
| 2012/0101713 | A1 | 4/2012 | Moshchuk | |
| 2012/0325573 | A1 * | 12/2012 | Miller | B60L 50/16 180/282 |
| 2013/0204501 | A1 * | 8/2013 | Keeney | B60T 1/10 701/70 |
| 2013/0219294 | A1 | 8/2013 | Goldman-Shenhar et al. | |
| 2015/0266383 | A1 | 9/2015 | Kidston et al. | |
| 2016/0039292 | A1 | 2/2016 | Takahashi | |
| 2017/0101082 | A1 * | 4/2017 | Ishida | B60T 7/042 |
| 2017/0101108 | A1 * | 4/2017 | Singh | B60C 23/0488 |
| 2017/0136916 | A1 | 5/2017 | Heisel et al. | |
| 2017/0267220 | A1 * | 9/2017 | Serra | B60T 8/52 |
| 2018/0319404 | A1 * | 11/2018 | Jonasson | B60W 10/18 |
| 2020/0172062 | A1 * | 6/2020 | Hanslik | B60T 1/093 |
| 2020/0353819 | A1 * | 11/2020 | Fujita | B60T 1/10 |
| 2021/0383040 | A1 * | 12/2021 | Cho | G06F 30/27 |
| 2021/0402972 | A1 * | 12/2021 | De Haseth | B60T 13/662 |
| 2022/0176826 | A1 * | 6/2022 | Cho | B60L 15/2009 |
| 2022/0373048 | A1 * | 11/2022 | Lee | F16D 51/24 |
| 2023/0373455 | A1 * | 11/2023 | Salter | B60T 7/22 |
| 2025/0135900 | A1 * | 5/2025 | Weng | B60L 7/26 |

FOREIGN PATENT DOCUMENTS

| | | | | |
|---|---|---|---|---|
| KR | 20220135799 | A * | 10/2022 | B24B 39/06 |
| KR | 20230128760 | A * | 9/2023 | B60T 13/662 |

OTHER PUBLICATIONS

Pant, Mayur, "Brake pad wear prediction through deep Machine Learning.", Oct. 17, 2023, IP.com PAD (Year: 2023).*

Translation of KR-20220135799-A (Year: 2022).*

Translation of KR-20230128760-A (Year: 2023).*

* cited by examiner

BLENDED VEHICLE BRAKE SYSTEMS AND CONTROL LOGIC WITH FRICTION BRAKE BURNISH LEARNING AND COMPENSATION

INTRODUCTION

The present disclosure relates generally to brake systems for motor vehicles. More specifically, aspects of this disclosure relate to blended friction-and-regenerative brake systems for one-pedal driving operations of electric-drive automobiles.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, corner modules, road wheels, etc.). Automobiles have historically been powered by a reciprocating-piston type internal combustion engine (ICE) assembly due to its ready availability and relative light weight, increased energy density, and overall efficiency. Hybrid electric and full electric vehicles (collectively "electric-drive vehicles"), on the other hand, utilize alternative power sources to propel the vehicle and, thus, minimize or eliminate reliance on a fossil-fuel based engine for tractive power. A full-electric vehicle (FEV), for example, altogether omits an internal combustion engine and attendant peripheral components from the powertrain system, relying instead on a rechargeable energy storage system (RESS) and a traction motor for vehicle propulsion. Hybrid-electric vehicle (HEV) powertrains, in contrast, employ multiple sources of tractive power to propel the vehicle, most commonly operating an internal combustion engine assembly in conjunction with a battery-powered or fuel-cell-powered traction motor.

Automobiles are typically equipped with a hydraulic, pneumatic, or electromechanical brake system that is activated by the vehicle driver or, for advanced driver assistance system (ADAS) and autonomous vehicle applications, by an on-board vehicle controller to selectively slow and ultimately stop the vehicle. The most common type of brake system used by modern-day passenger vehicles is a friction brake system in which a hydraulically actuated piston drives a brake pad or shoe ("friction brake element") into frictional engagement with a rotating drum or rotor ("rotating brake element"). For disk-type brake systems, the piston is reciprocally nested inside a brake caliper that mounts onto the steering knuckle, and the brake rotor is bolted onto the spindle to rotate with the wheel unit. In so doing, the friction brake system converts kinetic energy of the vehicle into heat energy of the frictionally engaged rotating and frictional brake elements in order to slow/stop rotation of a corresponding wheel unit. Some automobiles now employ a decentralized ("brake-by-wire") vehicle brake system in which an individual motor-driven actuator is incorporated into each wheel corner assembly and a central brake control module individually activates the actuators to provide a desired braking force at that wheel.

Hybrid-electric and full-electric vehicle applications may employ an electronic vehicle motion controller (VMC) to interpret an operator's accelerator and brake pedal positions in order to derive a desired axle torque. The VMC may then arbitrate the operator's desired axle torque against advanced driver assistance system (ADAS) torque requests and vehicle-automated "intervention" torque requests, such as vehicle overspeed protection, traction or stability control, regenerative braking, adaptive cruise control (ACC), etc. A final arbitrated axle torque request is then sent by the VMC to a powertrain control module (PCM) or a brake control module (BCM) to assess how to use a combination of actuators, such as the engine, traction motor(s), transmission, friction brakes, etc., to achieve a final desired axle torque. When the vehicle is moving in a forward direction of travel and the driver removes his/her foot from the accelerator pedal (a "tip-out" maneuver), the VMC may automatically command a negative axle torque to decelerate (decel) the vehicle. For electric-drive vehicles, a desired negative axle torque may be delivered by a "blended brake system" through combined applications of negative motor torque and engagement of the vehicle's friction brake system.

SUMMARY

Presented herein are intelligent vehicle brake systems with attendant control logic for friction brake burnish learning and compensation, methods for making and methods for operating such systems, and electric-drive vehicles equipped with such vehicle brake systems for optimized one-pedal driving (OPD). By way of non-limiting example, a retardation torque blending control protocol for a blended vehicle brake system continually estimates a current burnish state of the friction brake system and derives a friction brake compensation value for a corresponding brake clamping force to deliver a commanded deceleration. Many conventional vehicle brake systems compensate for friction variances using a single "compromised" brake friction coefficient to provide a minimum acceptable system performance over the course of the brake hardware's life cycle. In contrast, disclosed vehicle brake systems implement a friction brake thermal model, derive theoretical braking forces, and track real-time and commanded vehicle decelerations to estimate a burnish state of the friction brake hardware. Estimated burnish state is used to calculate an adjusted burnish-dependent coefficient of friction ($C_{fb}$) value; the Electronic Brake Control Module (EBCM) applies the adjusted coefficient to convert the commanded brake request to a modified brake pressure coefficient ($C_{pb}$). Doing so helps to minimize or outright eliminate inconsistent deceleration in the friction brakes due to friction coefficient variations caused by pad and rotor burnish. While not per se limited, disclosed solutions may be particularly applicable to electrohydraulic and electromagnetic brake systems of electric-drive automobiles.

Aspects of this disclosure are directed to blended vehicle brake systems, brake system control logic, and closed-loop feedback control techniques for friction brake burnish learning and compensation. In an example, a method is presented for operating a motor vehicle with a blended brake system, which includes both a regenerative (regen) brake system and a friction brake system that cooperatively decelerate one or more road wheels of the motor vehicle. This representative method includes, in any order and in any combination with any of the above and below disclosed options and features: receiving, e.g., via a resident or remote microcontroller, central processor, control module, logic device, integrated circuit (IC) device, or network of processors/controllers/modules/devices (collectively "vehicle controller") from a user input device (e.g., brake pedal) or a vehicle control module (e.g., ADAS module), a brake command with a corresponding total brake torque request for slowing/stopping the motor vehicle; determining, e.g., via the vehicle controller from the total brake torque request, a regen brake torque for the regen brake system and a friction brake torque for the friction brake system; optionally estimating, e.g., via the vehicle controller using the friction brake torque and an estimated temperature of a rotating friction brake element (e.g., drum or rotor), a temperature-dependent friction coefficient; estimating, e.g., via the vehicle controller using the friction brake torque and an estimated burnish state of the friction brake system, a burnish-dependent friction coefficient; determining, e.g., via the vehicle controller, a modified brake pressure coefficient using the burnish-dependent friction coefficient and, optionally, the temperature-dependent friction coefficient; determining a modified friction brake torque using the modified brake pressure coefficient; and commanding, e.g., via the vehicle controller, the friction brake system to apply the modified friction brake torque to one or more of the vehicle's road wheels.

Aspects of this disclosure are also directed to computer-readable media (CRM) containing controller-executable instructions for provisioning friction brake burnish learning and compensation for blended vehicle brake systems. In an example, a non-transient CRM stores instructions that are executable by one or more vehicle controllers of a motor vehicle with a blended brake system. These CRM-stored instructions, when executed, cause the vehicle controller(s) to perform operations, including: receiving, from a user input device or a vehicle control module of the motor vehicle, a vehicle brake command with a total brake torque request for the motor vehicle; determining, using the total brake torque request, a regen brake torque for the regen brake system and a friction brake torque for the friction brake system; estimating, using the friction brake torque and an estimated temperature of a rotating friction brake element, a temperature-dependent friction coefficient; estimating, using the friction brake torque and an estimated burnish state of the friction brake system, a burnish-dependent friction coefficient; determining a modified brake pressure coefficient using the temperature-dependent friction coefficient and the burnish-dependent friction coefficient; determining a modified friction brake torque using the modified brake pressure coefficient; and commanding the friction brake system to apply the modified friction brake torque to the one or more road wheels of the motor vehicle.

Additional aspects of this disclosure are directed to intelligent motor vehicles with optimized friction brake torque estimation and friction brake burnish learning and compensation for blended brake systems, e.g., to execute a one-pedal driving operation. As used herein, the terms "vehicle" and "motor vehicle" may be used interchangeably and synonymously to include any relevant vehicle platform, such as passenger vehicles, commercial vehicles, industrial vehicles, tracked vehicles, off-road and all-terrain vehicles (ATV), motorcycles, farm equipment, aircraft, spacecraft, etc. In an example, a motor vehicle includes a vehicle body with a passenger compartment, multiple road wheels attached to the vehicle body (e.g., via corner modules coupled to a unibody or body-on-frame chassis), and other standard original equipment. For electric-drive vehicle applications, one or more electric traction motors operate alone (e.g., for FEV powertrains) or in conjunction with an internal combustion engine assembly (e.g., for HEV powertrains) to selectively drive one or more of the road wheels to thereby propel the vehicle. Also attached to the vehicle body is a blended brake system, which includes a regenerative brake system and a friction brake system that cooperatively decelerate one or more of the road wheels responsive to brake commands from a user input device or a vehicle control module.

Continuing with the discussion of the above example, the vehicle also includes an onboard or off-board vehicle controller that is programmed to communicate with the user input device and/or vehicle control module to receive therefrom a vehicle brake command with a corresponding total brake torque request for slowing/stopping the vehicle. From the total brake torque request, the vehicle controller determines a regen brake torque for the regen brake system and a friction brake torque for the friction brake system. Using the friction brake torque and an estimated temperature of a rotating friction brake element, the controller may optionally estimate a temperature-dependent friction coefficient. Using the friction brake torque and an estimated burnish state of the friction brake system, the controller estimates a burnish-dependent friction coefficient. A modified brake pressure coefficient is calculated using the burnish-dependent friction coefficient and, optionally, the temperature-dependent burnish friction coefficient; a modified friction brake torque is derived from the modified brake pressure coefficient. The controller then commands the friction brake system to apply the modified friction brake torque to one or more of the vehicle's road wheels and may concurrently command the regen brake system to apply the regen brake torque to the one or more of the vehicle's road wheels.

For any of the disclosed vehicles, methods, and CRM, determining the friction brake torque for the friction brake system may include calculating an estimated total vehicle retardation torque using the total brake torque request and a propulsion retardation torque of the motor vehicle's propulsion system, and calculating an estimated total vehicle retardation force using the estimated total vehicle retardation torque and a predefined radius of the vehicle's road wheels. Determining the friction brake torque may also include calculating an estimated raw vehicle deceleration using the estimated total vehicle retardation force and a predefined mass of the motor vehicle, calculating a total expected vehicle deceleration using the estimated raw deceleration and a road grade compensation value, and extracting the friction brake torque from the total expected vehicle deceleration.

For any of the disclosed vehicles, methods, and CRM, estimating the burnish-dependent friction coefficient may be responsive to enabling a burnish learning mode. The burnish learning mode may be enabled responsive to a current vehicle speed of the motor vehicle exceeding a threshold minimum burnish speed, a chassis dyno mode being inactive, a wheel slip control mode being inactive, and/or a panic ("spike") braking operation being inactive. In this instance, commanding the friction brake system to apply the modified friction brake torque may be in response to the burnish learning mode being enabled. As another option, the vehicle controller may determine if the vehicle brake command is a valid brake burnish request. If the vehicle brake command is not a valid brake request, the vehicle controller may responsively command the friction brake system to apply the unmodified friction brake torque to the vehicle road wheel(s). Conversely, the vehicle controller may command the friction brake system to apply the modified friction brake torque in response to the vehicle brake command being a valid brake request.

For any of the disclosed vehicles, methods, and CRM, a vehicle brake command may be designated as a valid brake burnish request responsive to: an estimated total vehicle retardation torque being greater than a predefined threshold minimum torque; a friction brake apply percentage of the estimated total vehicle retardation torque applied by the friction brake system being greater than a predefined threshold minimum percentage; and/or a deceleration force magnitude of the vehicle brake command being greater than a predefined threshold minimum force magnitude. As another option, the vehicle controller may respond to the vehicle brake command being a valid brake request by communicating with an on-vehicle accelerometer (e.g., an inertial measurement unit (IMU)) to receive therefrom acceleration sensor data indicative of a current (real-time) vehicle deceleration of the motor vehicle. The controller may then estimate maximum and minimum expected vehicle decelerations associated with the total brake torque request, and determine a current operating state of the friction brake system based on the predicted maximum and minimum vehicle decelerations. In this instance, the burnish-dependent friction coefficient may be selected from a look-up table based on the friction brake system's current operating state.

For any of the disclosed vehicles, methods, and CRM, the current operating state of the friction brake system may be designated as: an under brake condition when the current vehicle deceleration is less than the minimum expected vehicle deceleration; an over brake condition when the current vehicle deceleration is greater than the maximum expected vehicle deceleration; or a nominal brake condition when the current vehicle deceleration is greater than the minimum expected vehicle deceleration and less than the maximum expected vehicle deceleration. As a further option, the burnish-dependent friction coefficient may be modified by a multiplier that is set to: a green burnish value between 0 and 1 responsive to the friction brake system's current operating state being the under brake condition, a track burnish value between 1 and 2 responsive to the current operating state being the over brake condition, and a nominal burnish value of 1 responsive to the current operating state being the nominal brake condition For any of the disclosed vehicles, methods, and CRM, estimating the burnish-dependent friction coefficient may include calculating a burnish energy analogue as a function of a current vehicle speed of the motor vehicle, a predefined runtime timestep, and the friction brake torque of the friction brake system. As a further option, calculating the burnish energy analogue may be in response to the estimated temperature of the rotating friction brake element exceeding a predefined minimum burnish temperature. As another option, estimating the burnish-dependent friction coefficient may include incrementing a burnish energy analogue count by the burnish energy analogue, and determining the burnish state of the friction brake system based on the burnish energy analogue count. Determining the burnish state of the friction brake system may include: setting the burnish state to a track burnish state responsive to the burnish energy analogue count being greater than a track burnish energy accumulation threshold; setting the burnish state to a green burnish state responsive to the burnish energy analogue count being less than the nominal burnish energy accumulation threshold; and setting the burnish state to a nominal burnish state responsive to the burnish energy analogue count being greater than the nominal burnish energy accumulation threshold and less than the track burnish energy accumulation threshold.

The above summary does not represent every embodiment or every aspect of the present disclosure. Rather, the foregoing summary merely provides a synopsis of some of the novel concepts and features set forth herein. The above features and advantages, and other features and attendant advantages of this disclosure, will be readily apparent from the following Detailed Description of illustrated examples and representative modes for carrying out the disclosure when taken in connection with the accompanying drawings and appended claims. Moreover, this disclosure expressly includes any and all combinations and subcombinations of the elements and features presented above and below.

Figure 1:
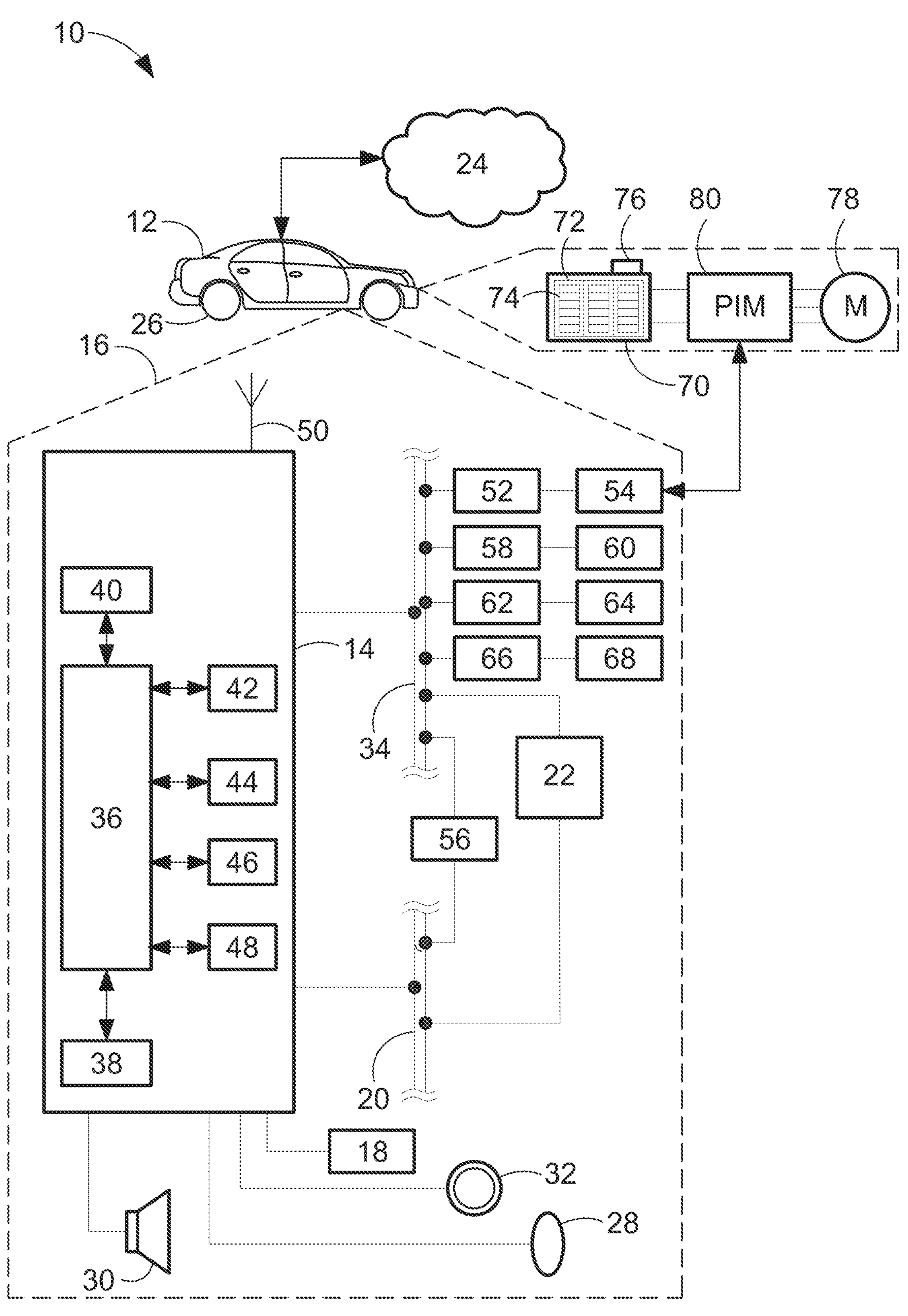
FIG. 1 is a partially schematic, side-view illustration of a representative motor vehicle with a friction brake system, a regenerative brake system, and a network of in-vehicle controllers, sensing devices, and communication devices for provisioning blended brake system operation in accordance with aspects of the present disclosure.

The present disclosure is amenable to various modifications and alternative forms, and some representative embodiments of the disclosure are shown by way of example in the drawings and will be described in detail herein. It should be understood, however, that the novel aspects of this disclosure are not limited to the particular forms illustrated in the above-enumerated drawings. Rather, this disclosure covers all modifications, equivalents, combinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, Brief Description of the Drawings, and Detailed Description sections, but not explicitly set forth in the claims, should not be incorporated into the claims, singly or collectively, by implication, inference or otherwise. Moreover, recitation of "first", "second", "third", etc., in the specification or claims is not per se used to establish a serial or numerical limitation; unless specifically stated otherwise, these designations may be used for case of reference to similar features in the specification and drawings and to demarcate between similar elements in the claims.

For purposes of this disclosure, unless specifically disclaimed: the singular includes the plural and vice versa (e.g., indefinite articles "a" and "an" should generally be construed as meaning "one or more"); the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein to denote "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface.

Referring now to the drawings, wherein like reference numbers refer to like features throughout the several views, there is shown in FIG. 1 a representative motor vehicle, which is designated generally at 10 and portrayed herein for purposes of discussion as a sedan-style, electric-drive automobile. The illustrated automobile 10—also referred to herein as "motor vehicle" or "vehicle" for short—is merely an exemplary application with which aspects of this disclosure may be practiced. In the same vein, execution of the present concepts by a blended vehicle brake system composed of an electrohydraulic disk brake system and an FEV traction motor should be appreciated as a non-limiting implementation of disclosed features. As such, it will be understood that aspects of this disclosure may be implemented for a variety of different blended vehicle brake system architectures and may be incorporated into any logically relevant type of motor vehicle. Moreover, only select components of the motor vehicle and vehicle brake system are shown and described in detail herein. Nevertheless, the vehicles and systems discussed below may include numerous additional and alternative features, and other available peripheral hardware, for carrying out the various methods and functions of this disclosure.

The representative vehicle 10 of FIG. 1 is originally equipped with a vehicle telecommunications and information ("telematics") unit 14 that wirelessly communicates, e.g., via cellular network, satellite service, wireless-enabled modem, etc., with a remotely located cloud computing host service 24 (e.g., ONSTAR®). Some of the other vehicle hardware components 16 shown generally in FIG. 1 include, as non-limiting examples, an electronic video display device 18, a microphone 28, audio speaker(s) 30, and assorted user input controls 32 (e.g., buttons, knobs, pedals, switches, touchpads, touchscreens, etc.). These hardware components 16 function, in part, as a human/machine interface (HMI) that enables a user to communicate with the telematics unit 14 and other components resident to and remote from the vehicle 10. Microphone 28, for instance, provides occupants with a means to input verbal commands; the vehicle 10 may be equipped with an embedded voice-processing unit utilizing audio filtering, editing, and analysis modules. Conversely, the speaker 30 provides audible output to a vehicle occupant and may be either a stand-alone speaker dedicated for the telematics unit 14 or may be part of an audio system 22. The audio system 22 is connected to a network connection interface 34 and an audio bus 20 to receive analog information, rendering it as sound, via one or more speaker components.

Communicatively coupled to the telematics unit 14 is a network connection interface 34, suitable examples of which include twisted pair/fiber optic Ethernet switches, parallel/serial communications buses, local area network (LAN) interfaces, controller area network (CAN) interfaces, and the like. The network connection interface 34 enables the vehicle hardware 16 to send and receive signals with one another and with various systems both onboard and off-board the vehicle body 12. This allows the vehicle 10 to perform assorted vehicle functions, such as modulating powertrain output, activating friction and regenerative brake systems, controlling vehicle steering, and other automated functions. For instance, telematics unit 14 may exchange signals with a Powertrain Control Module (PCM) 52, an Advanced Driver Assistance System (ADAS) module 54, a Regenerative Braking Control Module (RBCM) 56, a Friction Braking Control Module (FBCM) 58, an Electronic Brake Control Module (EBCM) 60, and assorted other vehicle ECUs, such as a transmission control module (TCM), an engine control module (ECM), a Sensor System Interface Module (SSIM), a Battery Control Module (BCM), a Steering Control Module (SCM), etc.

With continuing reference to FIG. 1, telematics unit 14 is an onboard computing device that provides a mixture of services, both individually and through its communication with other networked devices. This telematics unit 14 may be generally composed of one or more processors 40, each of which may be embodied as a discrete microprocessor, an application specific integrated circuit (ASIC), or a dedicated control module. Vehicle 10 may offer centralized vehicle control via a central processing unit (CPU) 36 that is operatively coupled to a real-time clock (RTC) 42 and one or more electronic memory devices 38, each of which may take on the form of a CD-ROM, magnetic disk, IC device, a solid-state drive (SSD) memory, a hard-disk drive (HDD) memory, flash memory, semiconductor memory (e.g., various types of RAM or ROM), etc.

Long-range communication (LRC) capabilities with remote, off-board devices may be provided via one or more or all of a cellular chipset/component, a navigation and location chipset/component (e.g., global positioning system (GPS) transceiver), or a wireless modem, all of which are collectively represented at 44. Close-range wireless connectivity may be provided via a short-range communication (SRC) device 46 (e.g., a BLUETOOTH® unit or near field communications (NFC) transceiver), a dedicated short-range communications (DSRC) component 48, and/or a dual antenna 50. The communications devices described above may provision data exchanges as part of a periodic broadcast in a vehicle-to-vehicle (V2V) communication system or a vehicle-to-everything (V2X) communication system, e.g., Vehicle-to-Infrastructure (V2I), Vehicle-to-Pedestrian (V2P), Vehicle-to-Device (V2D), Vehicle-to-Cloud (V2C), etc.

CPU 36 receives sensor data from one or more sensing devices that use, for example, photo detection, radar, laser, ultrasonic, optical, infrared, or other suitable technology, including short range communications technologies (e.g., DSRC) or Ultra-Wide Band (UWB) radio technologies, for executing a controller-automated (AV/ADAS) driving operation or a vehicle navigation service. In accord with the illustrated example, the automobile 10 may be equipped with one or more digital cameras 62, one or more range sensors 64, one or more vehicle speed sensors 66, one or more vehicle dynamics sensors 68, and any requisite filtering, classification, fusion, and analysis hardware and software for processing raw sensor data. The vehicle speed sensor(s) 66 may be in the nature of a mechanical or electromagnetic transmission shaft sensor or electronic wheel speed sensor for detecting vehicle speed. The vehicle dynamics sensor(s) 68 may be in the nature of a single-axis or a triple-axis accelerometer, an angular rate sensor, an inclinometer, steering wheel angle sensor, brake sensor, inertial measurement unit (IMU), etc., for detecting longitudinal and lateral acceleration, yaw, roll, and/or pitch rates, steering angle, and other dynamics related parameters. The type, placement, number, and interoperability of the distributed array of in-vehicle sensors may be adapted, singly or collectively, to a given vehicle platform for achieving a desired level of automated vehicle operation.

To propel the motor vehicle 10, an electrified powertrain is operable to generate and deliver tractive torque to one or more of the vehicle's drive wheels 26. The powertrain is represented in FIG. 1 by a rechargeable energy storage system (RESS), which may be in the nature of a chassis-mounted traction battery pack 70, that is operatively connected to an electric traction motor (M) 78. The traction battery pack 70 is generally composed of one or more battery modules 72 each containing a cluster of battery cells 74, such as lithium-class, zinc-class, nickel-class, or organosilicon-class cells of the pouch, can, or cylindrical type. One or more electric machines, such as traction motor/generator (M) units 78, draw electrical power from and, optionally, deliver electrical power to the battery pack 70. A power inverter module (PIM) 80 electrically connects the battery pack 70 to the motor(s) 78 and modulates the transfer of electrical current therebetween. The battery pack 70 may include an integrated electronics package, such as a wireless-enabled cell monitoring unit (CMU) 76, that enables on-module management, cell sensing, etc.

Discussed below are retardation torque blending systems and methods with a brake burnish procedure in which friction brake energy accumulation/dissipation is actively monitored to derive a burnish state of the friction brake portion of a blended vehicle brake system (e.g., Green Burnish, Street Burnish, Track Burnish, etc.). From a driver's brake command, for example, a corresponding torque request and expected vehicle deceleration may be obtained and compared to an actual vehicle deceleration measured by the vehicle's accelerometers. An expected state of burnish of the friction brake system is output from an energy accumulation model and compared with a predicted deceleration delta to confirm the current state of burnish is directionally correct. Once confirmed, the brake system control protocol adjusts the friction brake hardware's co-efficient of friction calibrations to compensate for the burnish state. In so doing, the vehicle EBCM is able to reduce the likelihood that the blended brake system provides excessive deceleration (over braking) or insufficient deceleration (under braking) compared to a driver or ADAS-commanded brake request.

Brake friction coefficient calibration values and corresponding brake burnish coefficient compensation values may be derived using virtual brake burnishing data, dynamometer (dyno) testing data, vehicle track testing data, and crowdsourced street use data. Coefficient calibrations may set to appropriate operating temperatures, clamping forces, time needed to burnish friction brake hardware, and corresponding pre and post-burnish hardware $C_f$ values. The brake burnish model may be implemented as part of a closed-loop feedback control protocol that may be updated by consuming data collected in-vehicle. Inaccuracies in the input data, such as real-time deceleration from the IMU, state estimation from wheel/vehicle speeds and accelerations, and brake rotor temperature model, may vary the brake burnish model. Plausibility checks and calibration limits may be implemented to prevent the brake burnish model from degrading braking performance or from adjusting friction brake system response in the incorrect direction.

Figure 2:
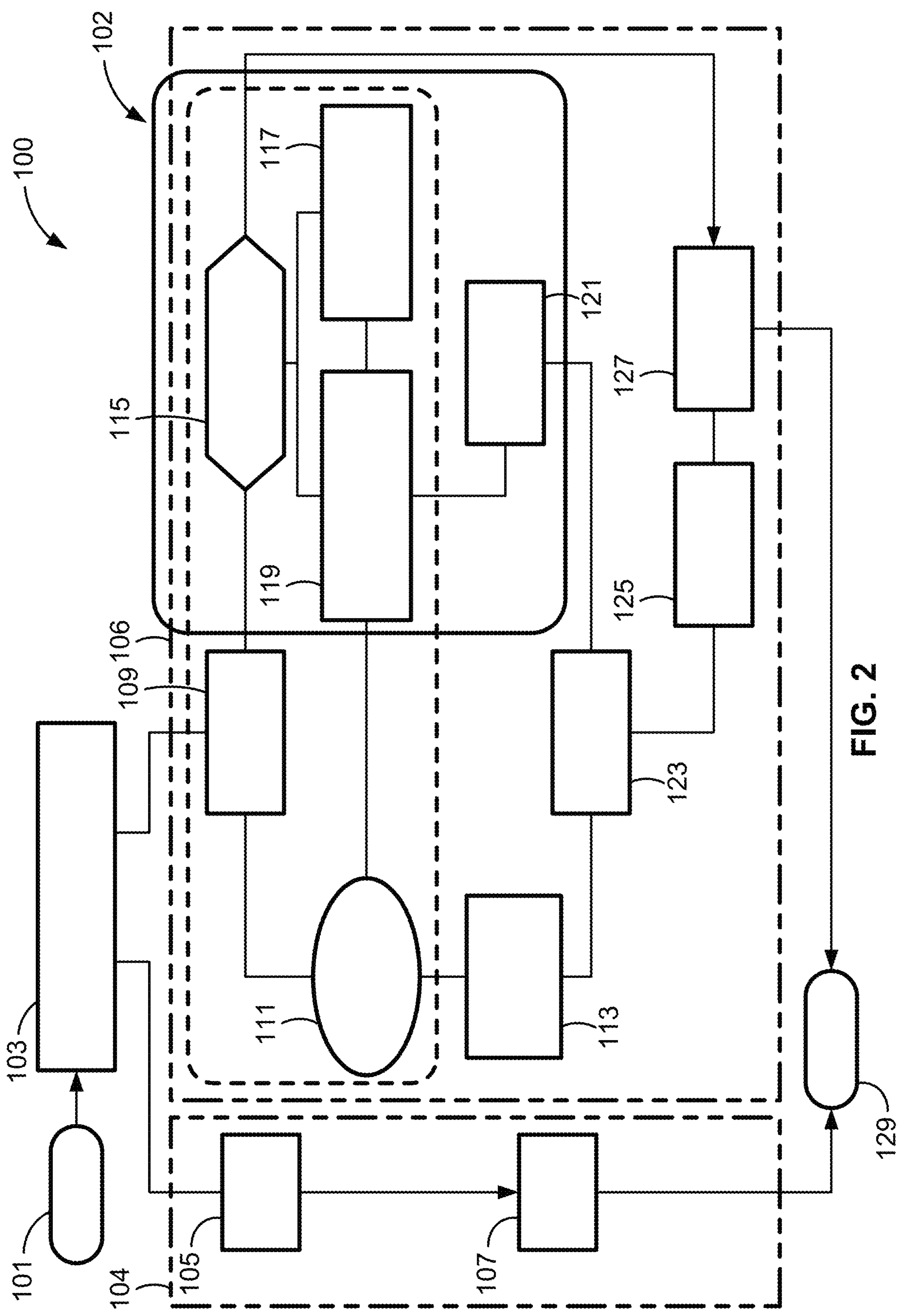
FIG. 2 is a flowchart illustrating a representative blended vehicle brake system control protocol for friction brake burnish learning and compensation, which may correspond to non-transient, memory-stored instructions that are executable by a resident or remote microcontroller, central processor, control module, programmable logic circuit, or other integrated circuit (IC) device or network of circuits/modules/microcontrollers/IC devices (collectively "controller") in accordance with aspects of the present disclosure.

With reference next to the flowchart of FIG. 2, an improved method or control protocol for friction brake burnish learning and compensation for a brake system, such as blended vehicle brake system 102 of FIG. 2, of a motor vehicle, such as electric-drive automobile 10 of FIG. 1, is generally described at 100 in accordance with aspects of the present disclosure. Some or all of the operations illustrated in FIG. 2 and described in further detail below may be representative of an algorithm that corresponds to non-transient, processor-executable instructions that are stored, for example, in main or auxiliary or remote memory (e.g., resident vehicle memory device(s) 38 and/or remote cloud computing service 24 database of FIG. 1). These instructions may be executed, for example, by a microcontroller, processing unit, programmable logic circuit, dedicated control module, or other module or device or network of controllers/modules/devices (e.g., vehicle CPU 36 and/or cloud host service 24 BO server-class computer of FIG. 1), to perform any or all of the above and below described functions associated with the disclosed concepts. It should be recognized that the order of execution of the illustrated operation blocks may be changed, additional operation blocks may be added, and some of the herein described operations may be modified, combined, or eliminated.

Method 100 may begin at START terminal block 101 of FIG. 2 with memory-stored, processor-executable instructions for initializing a closed-loop retardation torque blending protocol for modulating deceleration (decel) torque contributions from a regenerative brake system 104 segment and a friction brake system 106 segment of the vehicle brake system 102. This routine may be initialized in real-time, near real-time, continuously, systematically, sporadically, and/or at predefined time intervals, for example, each 10 or 100 milliseconds during use of the motor vehicle 10 of FIG. 1. As yet another option, terminal block 101 may initialize responsive to a user command prompt (e.g., via telematics 14 input controls), a resident vehicle controller prompt (e.g., from CPU 36), or a broadcast prompt signal received from a centralized back-office (BO) vehicle services system (e.g., from cloud host service 24). By way of non-limiting example, method 100 may automatically initialize in response to a driver of the motor vehicle 10 depressing an in-vehicle brake pedal or the ADAS module 54 issuing a deceleration request, e.g., as part of an automated vehicle response during adaptive cruise control (ACC) or advanced collision avoidance (ACA). Upon completion of some or all of the control operations presented in FIG. 2, method 100 may advance to END terminal block 129 and temporarily terminate or, optionally, may loop back to terminal block 101 and run in a continuous loop.

Advancing from terminal block 101 to BRAKE COMMAND process block 103, the method 100 may receive a vehicle brake command from a user input device or a vehicle control module to slow or stop the host vehicle. In accord with a non-limiting example, a driver releases an accelerator pedal or depresses a brake pedal to input a deceleration command for the motor vehicle. This deceleration control command may be accompanied or supplanted by a speed-change control command issued by a resident vehicle controller, such as ADAS module 54 of FIG. 1. Upon receipt of the foregoing operator-input vehicle control command(s), controller-executable instructions may cause the EBCM 60 to identify, e.g., from vehicle-calibrated deceleration response table, a brake torque request that corresponds to the speed-change command input by the driver and any accompanying controller-generated speed-change commands (e.g., total brake torque request of 1000 Newton-meters (Nm)). This acceleration table may include a memory-stored, controller-accessible acceleration response map file that maps a succession of vehicle speeds and vehicle acceleration/deceleration values with a corresponding succession of positive/negative torque outputs.

Method 100 continues to REGEN TORQUE CAPACITY process block 105 of FIG. 2 and determines a regen brake torque that will be contributed by the regen brake system 104 to achieve the total brake torque request associated with the vehicle brake command received at process block 103. The regen brake torque capacity may be typified as the maximum available brake torque that can be achieved by the host vehicle's powertrain actuator(s) under current vehicle operating conditions and associated powertrain hardware constraints. By way of example, and not limitation, the maximum available regen brake torque capacity may be an indication of a total regenerative braking torque output that can be produced by the entire powertrain system at the time of a desired vehicle braking operation (e.g., regen brake torque of 400 Nm). Once determined, a resident vehicle controller, such as EBCM 60, may command the RBCM 56 to govern the regen brake system 104 to apply the regen brake torque to one or more of the vehicle's road wheels to thereby slow the host vehicle, as indicated at REGEN TORQUE APPLY process block 107.

In tandem with process block 105, method 100 may execute FRICTION TORQUE CAPACITY process block 109 and concomitantly determine a friction brake torque that will be contributed by the friction brake system 106 to achieve the total brake torque request associated with the vehicle brake command received at process block 103. The friction brake torque capacity may be derived by first calculating an estimated total vehicle retardation torque (Nm) that will be experienced by the host vehicle, e.g., as the mathematical sum of the total brake torque request identified at process block 103 and a total propulsion retardation torque caused by the vehicle's propulsion system (e.g., predicted driveline drag, predicted engine drag, predicted transmission drag, etc.). An estimated total vehicle retardation force (N) may be calculated as the mathematical division of the estimated total vehicle retardation torque by a manufacturer-defined or controller-estimated radius of one or more of the host vehicle's road wheels. An estimated raw vehicle deceleration may then be calculated as the mathematical division of the estimated total vehicle retardation force and a manufacturer-defined or controller-estimated mass of the host vehicle. The estimated raw vehicle deceleration may be mathematically subtracted from a road grade compensation value to calculate a total expected vehicle deceleration. The friction brake torque capacity of process block 109 may be extracted from the total expected vehicle deceleration by accessing a dedicated look-up table that maps vehicle deceleration values with respective friction brake torque values.

With continuing reference to FIG. 2, method 100 may advance to FRICTION BRAKE TEMP process block 111 to estimate an operating temperature of a rotating friction brake element (e.g., brake drum or disc brake rotor) of the friction brake system 106. In a representative use-case scenario, a predefined thermal model may combine thermal models of rotor/drum wear, fatigue, driver use load, etc., to estimate a current operating temperature of a brake rotor/drum of the friction brake system 106. This estimation may be based on established physics of a brake pad being pressed by a hydraulic, pneumatic, or electromechanical actuator against the rotor/drum and any attendant core system constraints, such as ambient air temperature, current/initial rotor/drum temperature estimate (e.g., from key-on), rotor/drum thermal mass, rotor/drum specific heat capacity, co-efficient of friction, torque, calibratable heating and cooling coefficients, etc.

At TEMP FRICTION COEFFICIENT process block 113 of FIG. 2, method 100 uses the friction brake torque output from process block 109 and the estimated operating temperature of the friction brake rotor/drum output from process block 111 to derive a temperature-dependent coefficient of friction ($C_{ft}$). Referring again to the non-limiting example of FIG. 1, the EBCM 60 may access a resident memory devices 38 to retrieve a dedicated look-up table (e.g., Table 1 below) that maps a series of rotor/drum temperature values to respective friction coefficient values; the temperature-dependent friction coefficient is extracted from this lookup table using the estimated temperature. Recognizing that rotor/drum temperature typically changes much faster than brake burnish, the expected effect of the rotor/drum's temperature normally occurs faster and for a shorter term. Balancing or weighting of the temperature-dependent and burnish-dependent friction coefficient compensators may be determined during calibration of the blended brake system 102. The top row of Table 1 lists examples of estimated brake rotor temperatures, and the bottom row lists the respective coefficient of frictions corresponding to the estimated temperatures.

TABLE 1

| Example of Temperature Model Outputs | | | | | | | | |
|---|---|---|---|---|---|---|---|---|
| −200 | −100 | 0 | 100 | 300 | 500 | 800 | 1200 | 1500 |
| 4.01 | 5.01 | 5.90 | 6.56 | 6.90 | 7.25 | 7.97 | 9.16 | 11.00 |

Prior to, contemporaneous with, or after conducting a thermal learning model to derive a thermal-based compensator, method 100 conducts a burnish learning model to estimate a current burnish state of the friction brake hardware and concomitantly adjust the coefficient of friction value that is used to internally convert an intended brake request to a friction brake clamping pressure/force. The illustrated burnish learning model may begin at VALID BRAKE APPLY decision block 115 to determine whether or not a given vehicle brake command is deemed to be a valid brake request (e.g., to verify that the brake request is a suitable brake request for purposes of burnish learning). A vehicle brake command may be designated as "valid" when:

(1) an estimated total vehicle retardation torque associated with the requested brake command exceeds a predefined threshold minimum burnish torque (e.g., total brake torque request ≥850 Nm);

(2) a percentage of the estimated total vehicle retardation torque applied by the friction brake system to execute the requested brake command exceeds a predefined threshold minimum burnish percentage (e.g., friction brake apply percentage ≥60%); and/or (3) a deceleration force magnitude associated with the requested brake command exceeds a predefined threshold minimum force magnitude (e.g., ≥0.2 G).

Upon determining that the vehicle brake command in question is not a valid brake request (Block 115=NO), method 100 may responsively exit the burnish learning model and command the FBCM 58 to govern the friction brake system 106 to apply the unmodified friction brake torque to one or more of the vehicle's road wheels to thereby slow the host vehicle, as indicated at FRICTION TORQUE APPLY process block 127. It is envisioned that FRICTION TORQUE APPLY process block 127 may be executed substantially concurrent with the REGEN TORQUE APPLY process block 107.

Responsive to a determination that the vehicle brake command is a valid brake request (Block 115=YES), method 100 may proceed with the burnish learning model and execute ACTUATOR COMPARISON CHECK process block 117 and evaluate the vehicle's available fast actuators that may be employed for executing a commanded vehicle brake operation. In this example, EBCM 60 may implement feedback and feed-forward inputs to synchronize one or more powertrain "fast" actuators (e.g., engine friction, motor braking, transmission braking, etc.) with one or more friction brake actuators (e.g., disc brake, drum brake, etc.) and, optionally, with one or more other vehicle actuators (e.g., active acro devices) to achieve a desired final brake torque. For instance, a final, modified friction brake torque request may be computed based on a commanded brake torque request and a system regen capacity that is constrained by any propulsion actuator capacity limits (e.g., battery power limits, motor/axle torque limits, etc.).

In tandem with process block 117, method 100 may execute BURNISH LEARNING MODEL process block 119 to determine a burnish state of the friction brake system 106 using an energy accumulation evaluation; this burnish state is used to derive a compensation value for modifying the commanded output of the friction brake system 106. Method 100 may first determine whether or not to enable the burnish learning model. According to a non-limiting example, the burnish learning mode may be enabled responsive to a determination that:

(1) a current vehicle speed of the host vehicle exceeds a predefined threshold minimum burnish speed (e.g., wheel speed sensor data indicates real-time vehicle speed ≥35 miles per hour (mph));

(2) a chassis dyno mode, which may disable portions of the host vehicle's chassis controls system, autonomous vehicle (AV) system, and some or all other ADAS systems when active, is presently inactive;

(3) a wheel slip control mode (e.g., electronic stability control (ESC)) is presently inactive; and/or (4) a panic ("spike") brake mode, which may automatically activate the vehicle's anti-lock brake system (ABS) in response to a rapid "panic" depression of the brake pedal, is presently inactive.

Responsive to a determination that the burnish learning model is disabled, the method 100 may responsively exit the burnish learning model.

Upon determining that the burnish learning model is enabled and the vehicle brake command is a valid brake burnish apply, method 100 may determine a current state of a friction brake condition ("Deceleration Delta Checker") to ensure that the vehicle responds in the manner expected with a modified friction brake torque. For instance, the EBCM 60 may communicate through the SSIM with an on-vehicle accelerometer (e.g., 3 or 6-DoF IMU module) to receive acceleration sensor data that is indicative of a current (real-time) vehicle deceleration of the host vehicle. At the same time, the EBCM 60 may access a memory-stored, vehicle-calibrated lookup table to retrieve a maximum expected vehicle deceleration and a minimum expected vehicle deceleration associated with the modified brake torque request.

A current operating state of the friction brake system may be derived by comparing the vehicle's real-time vehicle decel value to the predicted maximum and minimum vehicle decelerations, e.g., to determine if it falls within a predetermined acceptable range. In this example, the current operating state of friction brake system 106 ("friction brake condition") may be reported as an "under brake condition"—less deceleration than expected—when the vehicle's current deceleration value is less than the minimum expected vehicle deceleration (e.g., set UNDER BRAKE condition as TRUE). Conversely, the current friction brake condition may be reported as an "over brake condition"—more deceleration than expected—when the vehicle's current deceleration value is greater than the maximum expected vehicle deceleration (e.g., set OVER BRAKE condition as TRUE). On the other hand, the current friction brake condition may be reported as a "nominal brake condition"—within range of expected deceleration—when the host vehicle's current decel value is greater than the minimum expected vehicle deceleration and less than the maximum expected vehicle deceleration (e.g., set NOMINAL BRAKE condition as TRUE).

Evaluating the current state of the friction brake system helps to determine whether the resultant total brake torque output is greater than or less than expected. The Deceleration Delta Checker, in effect, may act as a fail-safe against the Energy Accumulation Model to ensure that this model is directionally correct by ensuring that the algorithm is not compensating the coefficient value in the wrong direction (i.e., adding decel to an over brake condition or detracting decel from an under brake condition). This safeguard helps to ensure the system compensates the co-efficient of friction value in the correct direction—ameliorating an under braked or over braked situation—by flagging and reporting a brake decel delta indicating the total vehicle brake torque output is too high or too low. The Deceleration Delta Checker may also act to either speed up or slow down learning and compensation of the Energy Accumulation Model when directionally correct, e.g., proportional to the difference between the actual deceleration and the expected deceleration. The state of burnish may be implemented as a category of burnish, e.g., broken down and defined as described above, and may be implemented as a numerical value between used as a multiplier against the static singular (traditional) coefficient of friction value.

At BURNISH FRICTION COEFFICIENT process block 121 of FIG. 2, method 100 estimates a burnish-dependent coefficient of friction ($C_{fb}$) using the friction brake torque output at process block 109 and the estimated burnish state of the friction brake system output at process block 119. To determine the burnish-dependent friction coefficient, the method 100 may first determine whether or not to accumulate or decay an energy analogue count (Burnish Counter). To accumulate the energy analogue count, a burnish energy analogue may be calculated in response to: (1) the burnish learning model being enabled; (2) the host vehicle's propulsion system being active; (3) the estimated temperature of the rotating friction brake element exceeding a predefined minimum burnish temperature ("Burnish Rotor Temperature Achieved"); and (4) the vehicle brake command is a valid brake request ("Valid Brake Apply TRUE"). If these conditional statements are true, a burnish-dependent friction coefficient may be derived by calculating a burnish energy analogue as a function of the current (real-time) vehicle speed of the host vehicle, a predefined runtime timestep (e.g., 5.0 milliseconds (ms)), and the friction brake torque of the friction brake system, i.e., Energy Analogue=Speed*Time*Friction Brake Torque. Method 100 may then report the calculated friction brake energy analogue and increment the burnish energy analogue count by the burnish energy analogue. The system may accumulate the energy analogue count—representative of the total energy amassed and converted by the friction brake system—over a predetermined number of valid brake applications (e.g., 50 valid applies). The system may also prohibit a negative energy analogue count or "clip" the energy analogue count as protective logic to prevent the software from faulting by inadvertently exceeding the minimum or maximum bounds declared of a signal in the CRM. If one of the conditional statements is not true, the system may responsively decay the energy analogue count.

After incrementing or decaying the burnish counter, method 100 may set the burnish state of the friction brake system to a track burnish state responsive to the burnish energy analogue count exceeding a preset track burnish energy accumulation threshold ("TRACK Burnish Active TRUE"). Conversely, the burnish state may be set to a green burnish state responsive to the burnish energy analogue count being less than the Nominal burnish energy accumulation threshold ("GREEN Burnish Active TRUE"). When the burnish energy analogue count is approximately equal to or less than the track burnish energy accumulation threshold, the burnish state may be set to a nominal burnish state ("NOMINAL Burnish Active TRUE"). As shown in Table 2 below, the burnish-dependent friction coefficient may be modified by a multiplier that is set to: (1) a green burnish value between 0 and 1 responsive to the current operating state of the friction brake system being a green/under brake condition; (2) a track burnish value between 1 and 2 responsive to the current operating state of the friction brake system being a track/over brake condition, or (3) a nominal burnish value of 1 responsive to the current operating state being a nominal brake condition. The top row of Table 2 lists the friction brake system's current burnish state, the middle row lists the state of burnish multiplier for each of the burnish states, and the bottom row lists the corresponding burnish-dependent friction coefficients.

TABLE 2

Example of Burnish Model Outputs

| GREEN | | | | NOMINAL | TRACK | | | |
|---|---|---|---|---|---|---|---|---|
| 0.80 | 0.85 | 0.90 | 0.95 | 1 | 1.05 | 1.10 | 1.15 | 1.20 |
| 10.81 | 13.52 | 15.90 | 17.70 | 18.6 | 19.50 | 21.50 | 24.70 | 29.65 |

The Energy Analogue Count may act as an energy accumulation mechanism that quantifies the energy being input into the friction brake hardware for processing purposes. The energy analogue counter, which may be measured in $Nm^2$, may be analogized to a 'leaky-bucket' that increments up during a valid friction brake application (valid brake applies for burnishing based on optimal rotor temperatures), a minimum pad clamping force (sufficient pressure to enable transfer of pad material to rotor (burnishing)), and continuous pad/rotor contact (no ABS, ESC, etc.). As the friction brake burnish increases the energy count increases accordingly. When the energy analogue count has become greater than a calibrated Green/Street/Track burnish enumeration calibratable threshold, a corresponding state of burnish Boolean is set. At any time when the energy analogue counter is not being incremented, the counter may decrement by a small, calibratable amount to account for the gradual de-burnishing that occurs naturally over time.

A burnish learning cross check may be performed to ensure that the energy accumulation model exhibits directionally correct behavior. If a green burnish state is active and an over brake condition is not active, the method 100 may set a "Green Burnish TRUE" flag and report the same; antithetically, if a green burnish state is active and an over brake condition is active, the method 100 may set a "Green Burnish FALSE" flag. On the other hand, if a track burnish state is active and an under brake condition is not active, the method 100 may set a "Track Burnish TRUE"; if a track burnish state is active and an under brake condition is active, the method 100 may set a "Track Burnish FALSE" flag. Otherwise, the method 100 may set and report a "Nominal Burnish TRUE" flag.

An adaptive burnish learn rate update process may be performed to adjust ("learn") the energy accumulation burnish thresholds to offset repeated over/under compensation of friction brake torque. For instance, if an under brake condition is flagged as active for a predefined number of prior brake applies and a green burnish state is not active for those applications (e.g., NO-GREEN-UNDER apply count ≥50), the method 100 may increment the green burnish threshold. In the same vein, if an over brake condition is flagged as active for a predefined number of prior brake applies and a track burnish is not active for those applications (e.g., NO-TRACK-OVER apply count ≥50), the method 100 may decrement the track burnish threshold.

Using the temperature-dependent friction coefficient ($C_{ft}$) output from process block 113 and the burnish-dependent friction coefficient ($C_{fb}$) output from process block 121, method 100 may execute MODIFIED CLAMP FORCE process block 123 and determine a modified brake coefficient of pressure ($C_{pm}$) and, from that modified value, determine a clamping force for the friction brake system 106. For a disc brake system, the braking force $F_b$ between the brake pads and rotor is a function of a tangential friction force $F_n$, which may be calculated as $F_b=2\times\mu\times F_n$, where μ is the coefficient of friction between the pad and the disc. The clamping force of a brake caliper may be calculated as a brake line pressure multiplied by the caliper's total piston area. At BRAKE PRESSURE EVAL process block 125, the method 100 may confirm that the modified brake pressure coefficient falls within system-calibrated maximum and minimum pressure constraints. Method 100 may thereafter complete the burnish learning model and command the FBCM 58 to govern the friction brake system 106 to apply the modified friction brake torque to one or more of the vehicle's road wheels to thereby slow the host vehicle, as indicated at FRICTION TORQUE APPLY process block 127.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

Any of the methods described herein may include machine readable instructions for execution by: (a) a processor, (b) a controller, and/or (c) any other suitable processing device. Any algorithm, software, control logic, protocol, or method disclosed herein may be embodied as software stored on a tangible medium such as, for example, a flash memory, a solid-state drive (SSD) memory, a hard-disk drive (HDD) memory, a CD-ROM, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms may be described with reference to flowcharts and/or workflow diagrams depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method of operating a motor vehicle with a blended brake system, the blended brake system including a regenerative (regen) brake system and a friction brake system operable to decelerate one or more road wheels of the motor vehicle, the method comprising:

receiving, via a vehicle controller from a user input device or a vehicle control module, a vehicle brake command with a total brake torque request for the motor vehicle;

determining, via the vehicle controller using the total brake torque request, a regen brake torque for the regen brake system and a friction brake torque for the friction brake system;

determining an estimated burnish state of the friction brake system including calculating a burnish energy analogue as a function of a current vehicle speed of the motor vehicle, a predefined runtime timestep, and the friction brake torque of the friction brake system;

estimating, via the vehicle controller using the friction brake torque and the estimated burnish state of the friction brake system, a burnish-dependent friction coefficient;

determining, via the vehicle controller, a modified brake pressure coefficient using the burnish-dependent friction coefficient;

determining a modified friction brake torque using the modified brake pressure coefficient; and commanding, via the vehicle controller, the friction brake system to apply the modified friction brake torque to the one or more road wheels of the motor vehicle.

2. The method of claim 1, wherein determining the friction brake torque for the friction brake system includes:

calculating an estimated total vehicle retardation torque using the total brake torque request and a propulsion retardation torque of a propulsion system of the motor vehicle; and calculating an estimated total vehicle retardation force using the estimated total vehicle retardation torque and a predefined radius of the one or more road wheels.

3. The method of claim 2, wherein determining the friction brake torque for the friction brake system further includes:

calculating an estimated raw vehicle deceleration using the estimated total vehicle retardation force and a predefined mass of the motor vehicle;

calculating a total expected vehicle deceleration using the estimated raw vehicle deceleration and a road grade compensation value; and extracting the friction brake torque from the total expected vehicle deceleration.

4. The method of claim 1, wherein estimating the burnish-dependent friction coefficient is responsive to enabling a burnish learning mode, the burnish learning mode being enabled responsive to a current vehicle speed of the motor vehicle exceeding a threshold minimum speed.

5. The method of claim 1, further comprising:

determining if the vehicle brake command is a valid brake request; and commanding, via the vehicle controller responsive to the vehicle brake command not being the valid brake request, the friction brake system to apply the friction brake torque to the one or more road wheels of the motor vehicle, wherein commanding the friction brake system to apply the modified friction brake torque is responsive to the vehicle brake command being the valid brake request.

6. The method of claim 5, wherein the vehicle brake command is determined to be the valid brake request responsive to an estimated total vehicle retardation torque being greater than a predefined threshold minimum torque, a friction brake apply percentage of the estimated total vehicle retardation torque applied by the friction brake system being greater than a predefined threshold minimum percentage, and/or a deceleration force magnitude of the vehicle brake command being greater than a predefined threshold minimum force magnitude.

7. The method of claim 5, further comprising:

receiving, via the vehicle controller from an accelerometer of the motor vehicle responsive to the vehicle brake command being the valid brake request, acceleration sensor data indicative of a current vehicle deceleration of the motor vehicle;

estimating maximum and minimum expected vehicle decelerations associated with the total brake torque request of the vehicle brake command; and determining a current operating state of the friction brake system based on the maximum and minimum expected vehicle decelerations, wherein the burnish-dependent friction coefficient is selected from a look-up table based on the current operating state of the friction brake system.

8. The method of claim 7, wherein the current operating state of the friction brake system is determined to be:

an under brake condition when the current vehicle deceleration is less than the minimum expected vehicle deceleration;

an over brake condition when the current vehicle deceleration is greater than the maximum expected vehicle deceleration; and a nominal brake condition when the current vehicle deceleration is greater than the minimum expected vehicle deceleration and less than the maximum expected vehicle deceleration.

9. The method of claim 8, wherein the burnish-dependent friction coefficient is modified by a multiplier that is set to a green burnish value between 0 and 1 responsive to the current operating state of the friction brake system being the under brake condition, a track burnish value between 1 and 2 responsive to the current operating state of the friction brake system being the over brake condition, and a nominal burnish value of 1 responsive to the current operating state being the nominal brake condition.

10. The method of claim 1, further comprising estimating, using the friction brake torque and an estimated temperature of a rotating friction brake element of the friction brake system, a temperature-dependent friction coefficient, wherein the modified brake pressure coefficient is a function of both the burnish-dependent friction coefficient and the temperature-dependent friction coefficient.

11. The method of claim 10, wherein calculating the burnish energy analogue is responsive to the estimated temperature of the rotating friction brake element exceeding a predefined minimum burnish temperature.

12. The method of claim 1, wherein estimating the burnish-dependent friction coefficient further includes:

incrementing a burnish energy analogue count by the burnish energy analogue; and determining the estimated burnish state of the friction brake system based on the burnish energy analogue count.

13. The method of claim 12, wherein determining the estimated burnish state of the friction brake system includes:

setting the burnish state to a track burnish state responsive to the burnish energy analogue count being greater than a track burnish energy accumulation threshold;

setting the burnish state to a green burnish state responsive to the burnish energy analogue count being less than a nominal burnish energy accumulation threshold; and setting the burnish state to a nominal burnish state responsive to the burnish energy analogue count being greater than the nominal burnish energy accumulation threshold and less than the track burnish energy accumulation threshold.

14. A non-transient, computer-readable medium storing instructions executable by one or more vehicle controllers of a motor vehicle with a blended brake system, the blended brake system including a regenerative (regen) brake system and a friction brake system operable to decelerate one or more road wheels of the motor vehicle, the instructions, when executed, causing the one or more vehicle controllers to perform operations comprising:

receiving, from a user input device or a vehicle control module of the motor vehicle, a vehicle brake command with a total brake torque request for the motor vehicle;

determining, using the total brake torque request, a regen brake torque for the regen brake system and a friction brake torque for the friction brake system;

estimating, using the friction brake torque and an estimated temperature of a rotating friction brake element, a temperature-dependent friction coefficient;

determining an estimated burnish state of the friction brake system including calculating a burnish energy analogue as a function of a current vehicle speed of the motor vehicle, a predefined runtime timestep, and the friction brake torque of the friction brake system;

estimating, using the friction brake torque and the estimated burnish state of the friction brake system, a burnish-dependent friction coefficient;

determining a modified brake pressure coefficient using the temperature-dependent friction coefficient and the burnish-dependent friction coefficient;

determining a modified friction brake torque using the modified brake pressure coefficient;

commanding the friction brake system to apply the modified friction brake torque to the one or more road wheels of the motor vehicle; and commanding the regen brake system to apply the regen brake torque to the one or more road wheels of the motor vehicle.

15. A motor vehicle, comprising:

a vehicle body;

a plurality of road wheels attached to the vehicle body;

a prime mover attached to the vehicle body and configured to drive at least one of the road wheels to thereby propel the motor vehicle;

a blended brake system attached to the vehicle body and including a regenerative (regen) brake system and a friction brake system both operable to decelerate one or more of the road wheels responsive to brake commands from a user input device or a vehicle control module; and a vehicle controller programmed to:

receive, from the user input device or the vehicle control module, a vehicle brake command with a total brake torque request for the motor vehicle;

determine, using the total brake torque request, a regen brake torque for the regen brake system and a friction brake torque for the friction brake system;

determine an estimated burnish state of the friction brake system including calculating a burnish energy analogue as a function of a current vehicle speed of the motor vehicle, a predefined runtime timestep, and the friction brake torque of the friction brake system;

estimate, using the friction brake torque and the estimated burnish state of the friction brake system, a burnish-dependent friction coefficient;

determine a modified brake pressure coefficient using the burnish-dependent friction coefficient;

determine a modified friction brake torque using the modified brake pressure coefficient; and command the friction brake system to apply the modified friction brake torque to the one or more road wheels of the motor vehicle.

16. The motor vehicle of claim 15, wherein determining the friction brake torque for the friction brake system includes:

calculating an estimated total vehicle retardation torque using the total brake torque request and a propulsion retardation torque of a propulsion system of the motor vehicle; and calculating an estimated total vehicle retardation force using the estimated total vehicle retardation torque and a predefined radius of the one or more road wheels.

17. The motor vehicle of claim 16, wherein determining the friction brake torque for the friction brake system further includes:

calculating an estimated raw vehicle deceleration using the estimated total vehicle retardation force and a predefined mass of the motor vehicle;

calculating a total expected vehicle deceleration using the estimated raw vehicle deceleration and a road grade compensation value; and extracting the friction brake torque from the total expected vehicle deceleration.

18. The motor vehicle of claim 15, wherein the vehicle controller is further programmed to:

determine if the vehicle brake command is a valid brake request; and responsive to the vehicle brake command not being the valid brake request, command the friction brake system to apply the friction brake torque to the one or more road wheels of the motor vehicle, wherein commanding the friction brake system to apply the modified friction brake torque is responsive to the vehicle brake command being the valid brake request.

19. The motor vehicle of claim 15, wherein estimating the burnish-dependent friction coefficient is responsive to enabling a burnish learning mode, the burnish learning mode being enabled responsive to a current vehicle speed of the motor vehicle exceeding a threshold minimum burnish speed, a chassis dyno mode being inactive, a wheel slip control mode being inactive, and/or a spike brake operation being inactive, wherein commanding the friction brake system to apply the modified friction brake torque is responsive to the burnish learning mode being enabled.

20. The motor vehicle of claim 15, wherein the vehicle controller is further programmed to determine if an estimated temperature of a rotating friction brake element of the friction brake system exceeds a predefined minimum burnish temperature wherein calculating the burnish energy analogue is responsive to the estimated temperature exceeding the predefined minimum burnish temperature.

* * * * *